(12) United States Patent
Nakamura

(10) Patent No.: US 7,395,197 B2
(45) Date of Patent: Jul. 1, 2008

(54) VERIFICATION METHOD AND SYSTEM FOR LOGIC CIRCUIT

(75) Inventor: Yuichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

(21) Appl. No.: 10/935,270

(22) Filed: Sep. 8, 2004

(65) Prior Publication Data

US 2005/0055189 A1   Mar. 10, 2005

(30) Foreign Application Priority Data

Sep. 9, 2003   (JP) ............................. 2003-316196

(51) Int. Cl.
*G06F 17/50* (2006.01)
*G06F 3/00* (2006.01)

(52) U.S. Cl. .............................. 703/17; 703/15; 703/21; 716/5; 714/28

(58) Field of Classification Search .................. 703/15, 703/17, 21; 716/5; 714/28
See application file for complete search history.

(56) References Cited

U.S. PATENT DOCUMENTS

| | | | |
|---|---|---|---|
| 4,873,630 A | * | 10/1989 | Rusterholz et al. ............. 712/3 |
| 5,546,562 A | | 8/1996 | Patel |
| 6,389,383 B1 | * | 5/2002 | Sarathy et al. ................. 703/21 |
| 6,931,612 B1 | * | 8/2005 | Potkonjak et al. .............. 716/5 |
| 7,054,802 B2 | * | 5/2006 | Ohkami ....................... 703/15 |
| 2002/0152060 A1 | * | 10/2002 | Tseng ......................... 703/17 |

FOREIGN PATENT DOCUMENTS

JP   2000-215226 A   8/2000

OTHER PUBLICATIONS

M. Kudlugi et al., "A Transaction-Based Unified Simulation/Emulation Architecture for Functional Verification," IEEE Design Automation Conference, 2001, pp. 623-628.

* cited by examiner

*Primary Examiner*—Thai Phan
(74) *Attorney, Agent, or Firm*—Foley & Lardner LLP

(57) ABSTRACT

A shared register row is provided between a program-based circuit simulator and a device-based circuit simulator. The shared register row includes a plurality of shared registers each corresponding to signals transmitted between the program-based and device-based circuit simulators. By mutually accessing a shared register corresponding to a signal from the program-based and device-based circuit simulators, the signal is transferred via the corresponding shared register with synchronization between the program-based and device-based circuit simulators.

20 Claims, 8 Drawing Sheets

VERIFICATION METHOD AND SYSTEM FOR LOGIC CIRCUIT

BACKGROUND OF THE INVENTION

1. Field of the Invention

The present invention relates to a verification technique for a logic circuit, and particularly relates to a method and system for verifying whether a given logic circuit to be verified properly operates, by creating an operation simulation device for the logic circuit, virtually inputting signals to the simulation device, and checking its outputs against respective expected values.

2. Description of the Related Art

Logic verification systems generally used for verification of logic circuits are composed of a software simulator for simulating a portion of a logic circuit by executing a program on a computer, a hardware emulator for emulating another portion of the logic circuit by using a reconfigurable device, and buffer memory for absorbing the difference in processing speed between the software simulator and the hardware emulator to synchronize them.

For example, a circuit verification system is disclosed in Japanese Laid-open Patent Application No. 2000-215226 (paragraphs 0046 through 0052 and FIGS. 1 and 2) wherein the circuit to be verified is divided into a first portion verified by a hardware emulator and a second portion verified by a software simulator, the clocks of the hardware emulator and the software emulator are synchronized via a communication device, and mutual transfer of data is performed.

Similarly, in U.S. Pat. No. 5,546,562 and Kudlugi et al. (Murali Kudlugi, Soha Hassoun, Charles Selvidge, Duaine Pryor, "A Transaction-based Unified Simulation/Emulation Architecture for Functional Verification," IEEE Design Automation Conference, 2001, pp. 623-628), FIFO (first-in first-out) memory is provided between a simulator and an emulator, and a signal transmitted from the simulator reaches the emulator via several steps through the FIFO memory. Transmission from the emulator to the simulator on the computer is also performed via FIFO memory in the same manner.

However, the signal transmitted between the hardware emulator and the software simulator passes through the FIFO memory or buffer memory, so there is a possibility that values can vary despite attempting to reference a specific signal value simultaneously from the emulator and the simulator. In other words, strictly speaking, a temporal displacement in processing inevitably occurs between the hardware emulator and the software simulator. Accordingly, when a combination of a computer program and a reconfigurable device is considered as the simulated structure of the logic circuit, the simulated structure and the logic circuit to be verified cannot be said to have exactly the same structure, and the accuracy thereof as a simulation device is low.

SUMMARY OF THE INVENTION

An object of the present invention is to provide a verification method and verification system whereby a simulated portion implemented by a program on a computer and another simulated portion implemented by a reconfigurable device can be easily synchronized in time, resulting in the increased accuracy of the simulation device.

According to the present invention, a system for verifying a logic circuit by simulating an operation of the logic circuit, includes: a program-based simulator for simulating a portion of the operation of the logic circuit based on program; a device-based simulator for simulating another portion of the operation of the logic circuit based on device; and a shared register section having a plurality of registers each corresponding to signals transmitted between the program-based simulator and the device-based simulator, wherein a register corresponding to a signal is accessed from the program-based simulator and the device-based simulator to allow transfer of the signal between the program-based simulator and the device-based simulator.

According to a first embodiment, the shared register section comprises a first register section provided to the program-based simulator and a second register section provided to the device-based simulator, wherein values stored in the first register section are always made equal to those stored in the second register section.

According to a second embodiment, the shared register section comprises a software register section provided to the program-based simulator.

According to a third embodiment, the shared register section comprises a hardware register section provided to the device-based simulator.

According to a fourth embodiment, the system further includes an encoder/decoder section for encoding and decoding data stored in N registers of the shared register section to logically identify $2^N$ shared registers, where N is an integer equal to 2 or above.

According to another aspect of the present invention, a method for verifying a logic circuit using a program-based simulation system and a device-based simulation system, which simulate an operation of the logic circuit based on program and device, respectively, includes: preparing a plurality of shared registers, each of which is allowed to be accessed from the program-based simulation system and the device-based simulation system; allocating a plurality of signals transferred between the program-based simulation system and the device-based simulation system to different ones of the plurality of shared registers; writing data of a signal in a corresponding shared register by one of the program-based simulation system and the device-based simulation system; and reading the data of the signal from the corresponding shared register by the other of the program-based simulation system and the device-based simulation system.

The plurality of shared registers may comprises a software shared register row provided by software to the program-based simulation system, and a hardware shared register row provided by hardware to the device-based simulation system, wherein the software shared register row and the hardware shared register row are controlled so as to be made equal in stored data to each other.

According to still another aspect of the present invention, a two-way communication method between a program-based simulation system and a device-based simulation system, which simulate an operation of a logic circuit based on program and device, includes: allocating signals transmitted between the program-based simulation system and the device-based simulation system to different ones of a plurality of shared registers; when transmitting a signal from one of the program-based simulation system and the device-based simulation system to the other, causing the one to write data of the signal in a corresponding shared register; and when receiving the signal, causing the other to read the data of the signal from the corresponding shared register.

As described above, in accordance with the present invention, signals can be transmitted by coordinating a plurality of shared registers with each signal transmitted between a program-based simulator and a device-based simulator, and mutually accessing from them. For example, the program-based simulator writes a signal value to a corresponding shared register, whereupon the device-based simulator can synchronize therewith and read the same signal value from the corresponding shared register, and the program-based simulator and device-based simulator are thus able to operate in synchrony. By providing a shared register for each signal in this manner, maintaining synchronization between the program-based simulator and device-based simulator can be facilitated, and the accuracy of the simulation device can be increased.

Similarly, in the case where the program-based simulator is provided with a shared register row by means of software and the device-based simulator is provided with a shared register row by means of hardware, the synchronization described above can be obtained by controlling so that these shared register rows always have the same values.

DESCRIPTION OF THE PREFERRED EMBODIMENTS

Figure 1:
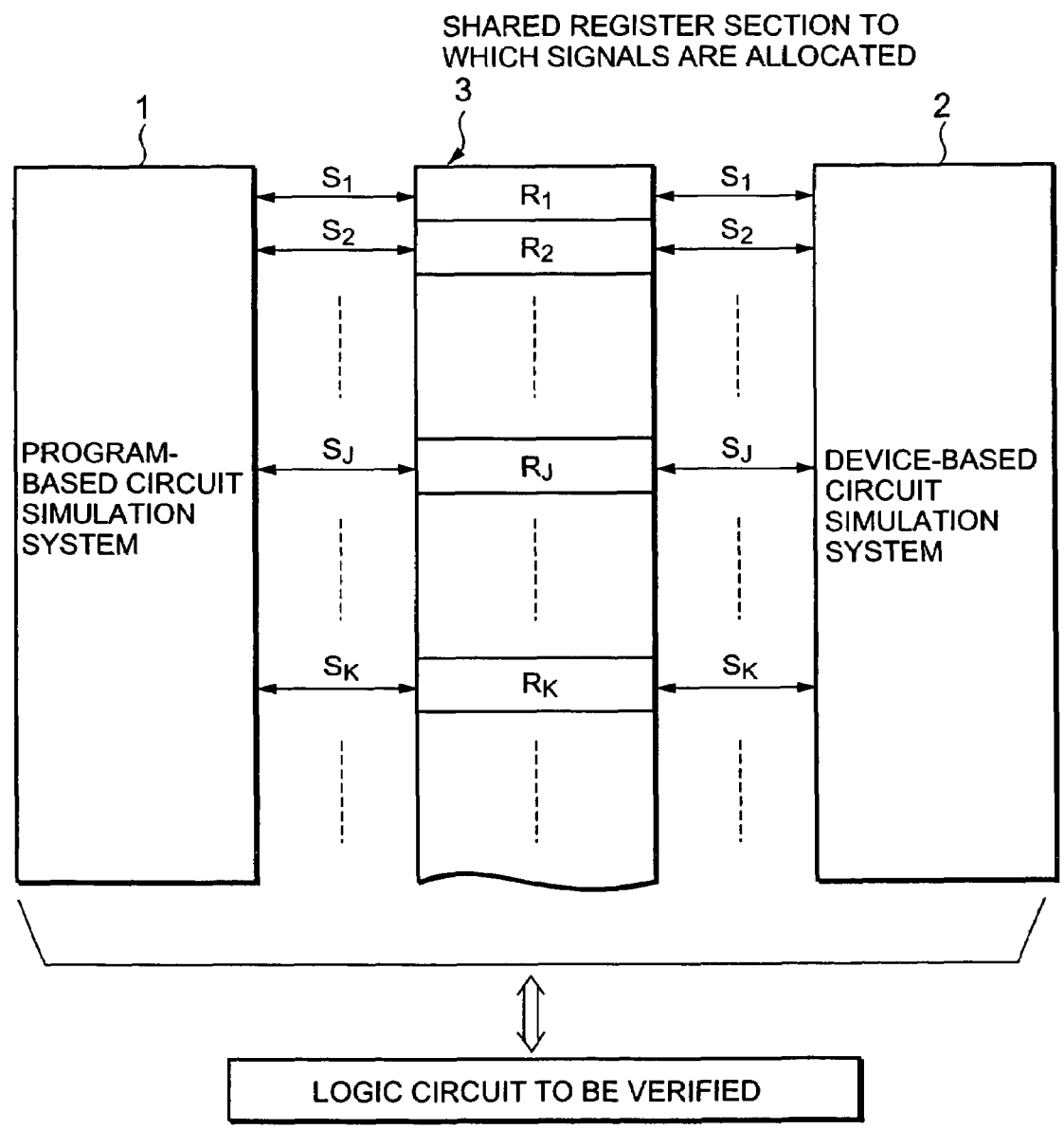
FIG. 1 is a block diagram showing the overall structure of a logic circuit verification system according to the present invention.

Referring to FIG. 1, a system according to the present embodiment has a program-based circuit simulation system 1, a device-based circuit simulation system 2, and a shared register section 3, and the overall operation of the logic circuit to be verified is simulated by exchanging signals via the shared register section 3 between the program-based circuit simulation system 1 and the device-based circuit simulation system 2.

The program-based circuit simulation system 1 simulates circuit operations such as multiplication and branching by using a computer program. The device-based circuit simulation system 2 simulates circuit operations by using a reconfigurable device such as an FPGA (field programmable logic array) or other reconfigurable device.

The shared register section 3 has at least one register row composed of N number of shared registers R1 through RN to each of which a number is assigned in advance, and each of the signals S1, S2, S3, . . . transmitted between the circuit simulation systems 1 and 2 is allocated to a different shared register. Specifically, a different number is assigned to each transmitted signal, and the shared register that has the same number as the number of the signal is allocated to the corresponding signal.

For example, when a signal SJ is allocated to the shared register RJ and the signal SJ is transmitted from the program-based circuit simulation system 1 to the device-based circuit simulation system 2, the program-based circuit simulation system 1 first writes the value of the signal SJ in the shared register RJ, and the device-based circuit simulation system 2 that has detected this fact reads the value of the signal SJ from the shared register RJ. Signals are transmitted in the same manner from the device-based circuit simulation system 2 to the program-based circuit simulation system 1.

A change in one signal generated by one of the simulation circuits is thus transmitted immediately at the timing of the other simulation circuit, so it becomes extremely easy to achieve synchronization between both circuit simulation systems. As described hereinafter, the shared register section 3 may also have a single register row, or may have two register rows each of which is made up of software and hardware that always have the same contents.

Figure 2:
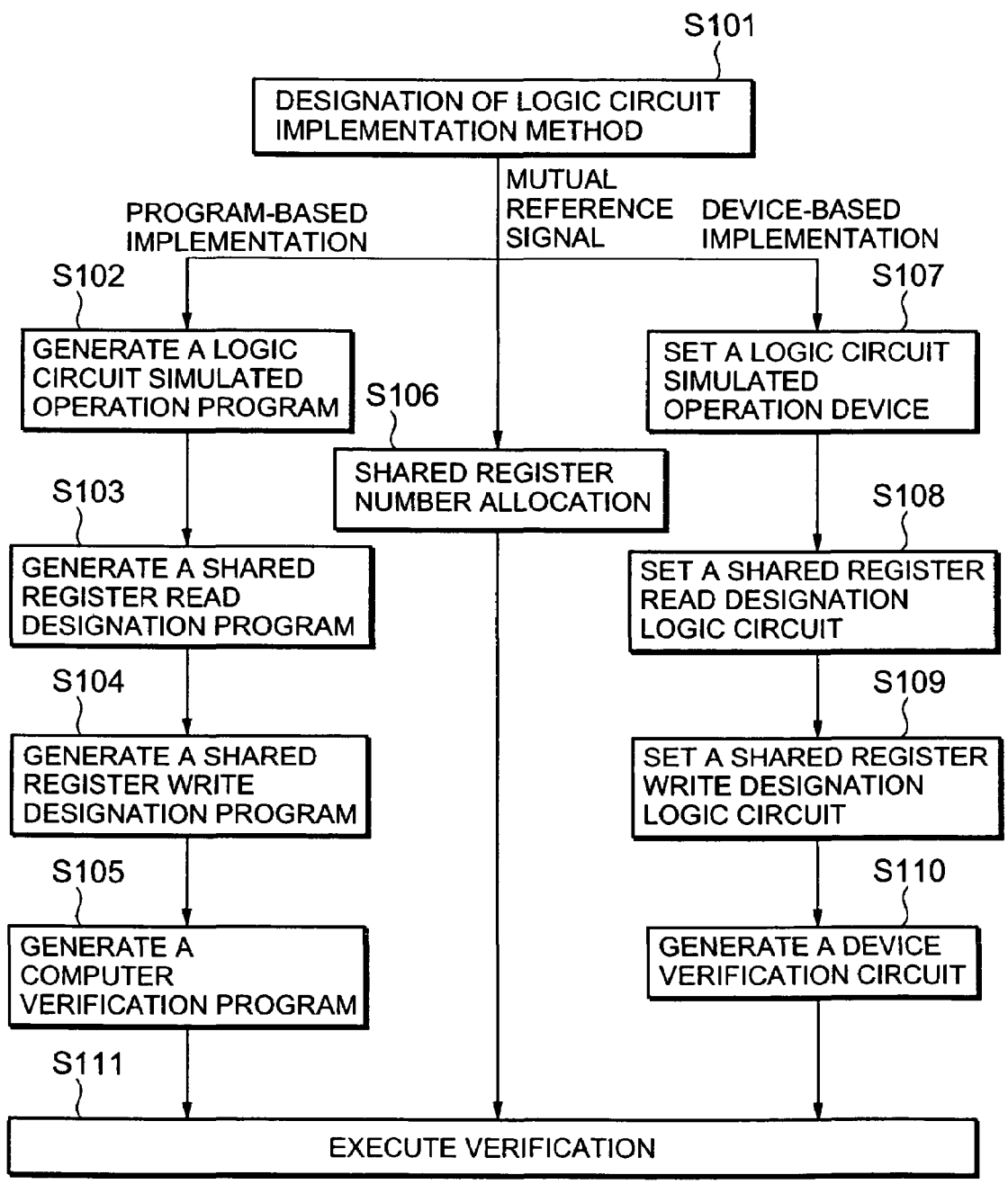
FIG. 2 is a flowchart showing the generation sequence of the computer verification program and device verification circuit in the logic circuit verification system of FIG. 1.

As shown in FIG. 2, a circuit implementation method is designated, which determines a portion of the logic circuit to be verified, which is implemented by the program, and another portion, which is implemented by the reconfigurable device (step S101).

In the case of program-based implementation, a logic circuit simulated operation program, a shared register read designation program, and a shared register write designation program are each generated (steps S102 through S104), and these programs are combined to generate a computer verification program (step. S105).

In the case of device-based implementation, a logic circuit simulated operation device, a shared register read designation logic circuit, and a shared register write designation logic circuit are each configured using a reconfigurable device (steps S107 through S109), and these circuits are combined to generate a device verification circuit (step S110).

Mutual communication between the computer verification program and the device verification circuit is performed by allocating a mutual reference signal to each shared register (step S106). The verification operation is executed by the computer verification program, the device verification circuit, and the shared register section thus obtained.

Figure 3:
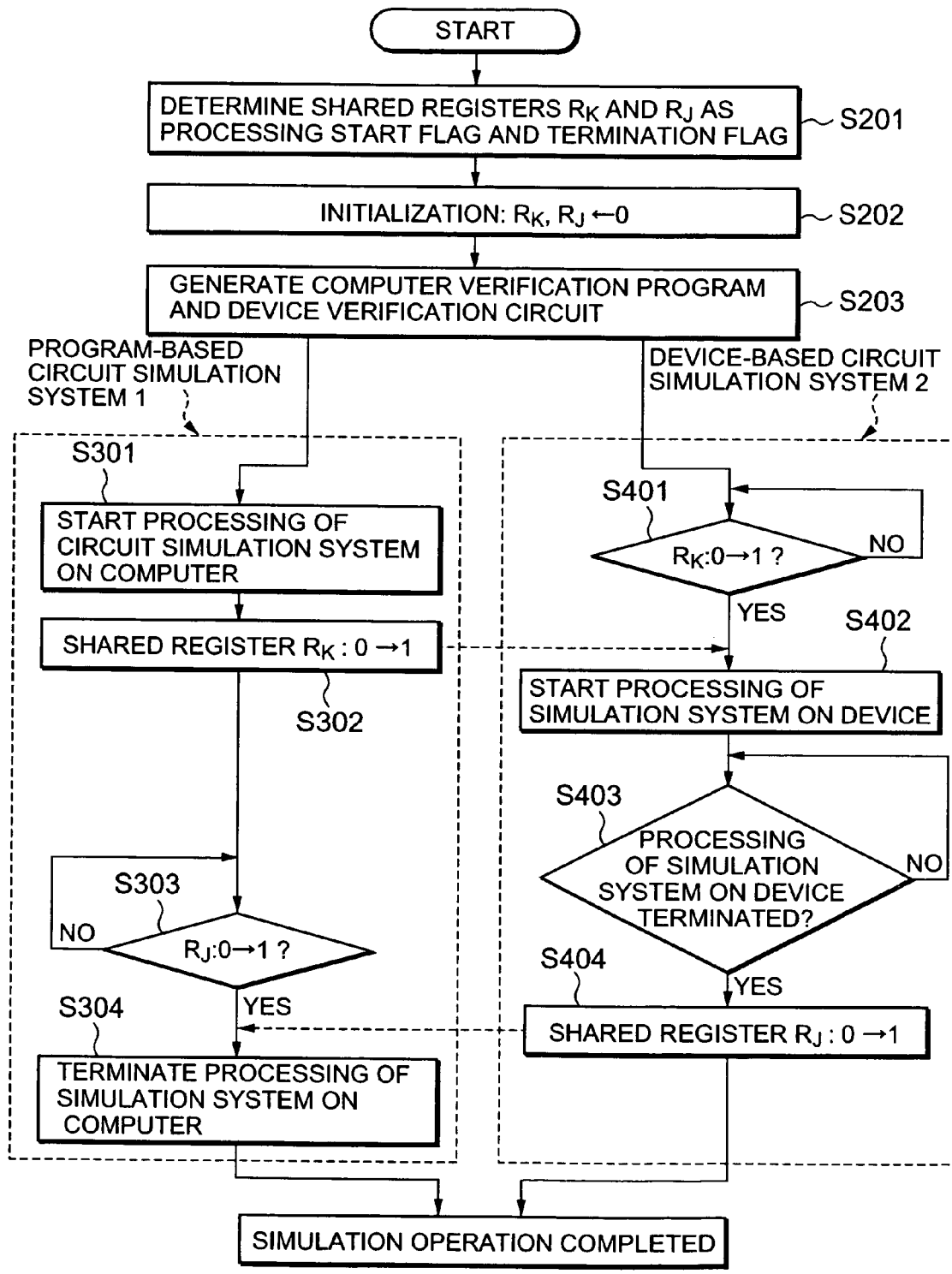
FIG. 3 is a flowchart showing a specific example of the operation of the logic circuit verification system of FIG. 1.

FIG. 3 shows an operation of the logic circuit verification system according to the present embodiment, taking as an example for simplicity a case in which two shared registers show the start and termination of processing, respectively.

First, the $K^{th}$ shared register $R_K$ is assigned as the processing start flag and the $J^{th}$ shared register $R_J$ is assigned as the processing termination flag (step S201), and both are initiated (step S202). After the computer verification program and device verification circuit are generated as described above (step S203), the program-based circuit simulation system 1 on the computer starts processing (step S301) and writes a 1 to the shared register $R_K$ (step S302). Writing to a shared register is executed by the shared register write designation program using its register number and a value to be written. Subsequently, the program-based circuit simulation system 1 monitors the shared register $R_J$ to determine whether its stored value has been set to "1" (step S303) The stored value in the shared register is read by the shared register read designation program according to the designated register number.

On the other hand, the device-based circuit simulation system 2 monitors the shared register $R_K$ to determine whether it has been set to "1" (step S401). The value stored in the shared register is read by the shared register read designation logic circuit according to the designated register number. When the device-based circuit simulation system 2 detects that the program-based circuit simulation system 1 writes a "1" into the shared register $R_K$ after starting its processing (YES in step S401), the device-based circuit simulation system 2 starts the processing (step S402). When this processing is completed (YES in step S403), a "1" is written in the shared register $R_J$ (step S404). Writing to a shared register is executed by the shared register write designation logic circuit using its register number and a value to be written.

When the program-based circuit simulation system 1 detects that the device-based circuit simulation system 2 terminates the processing to write a "1" into the shared register $R_J$ (YES in step S303), the program-based circuit simulation system 1 terminates the processing (step S304) and the overall simulation operation is completed.

The above-described example of FIG. 3 illustrates the case of initiation and completion of the processing. Since, the shared register section 3 is also capable of simultaneous access to multiple bits, further complex commands can also be transmitted between the program-based circuit simulation system 1 and the device-based circuit simulation system 2.

First Embodiment

Figure 4:
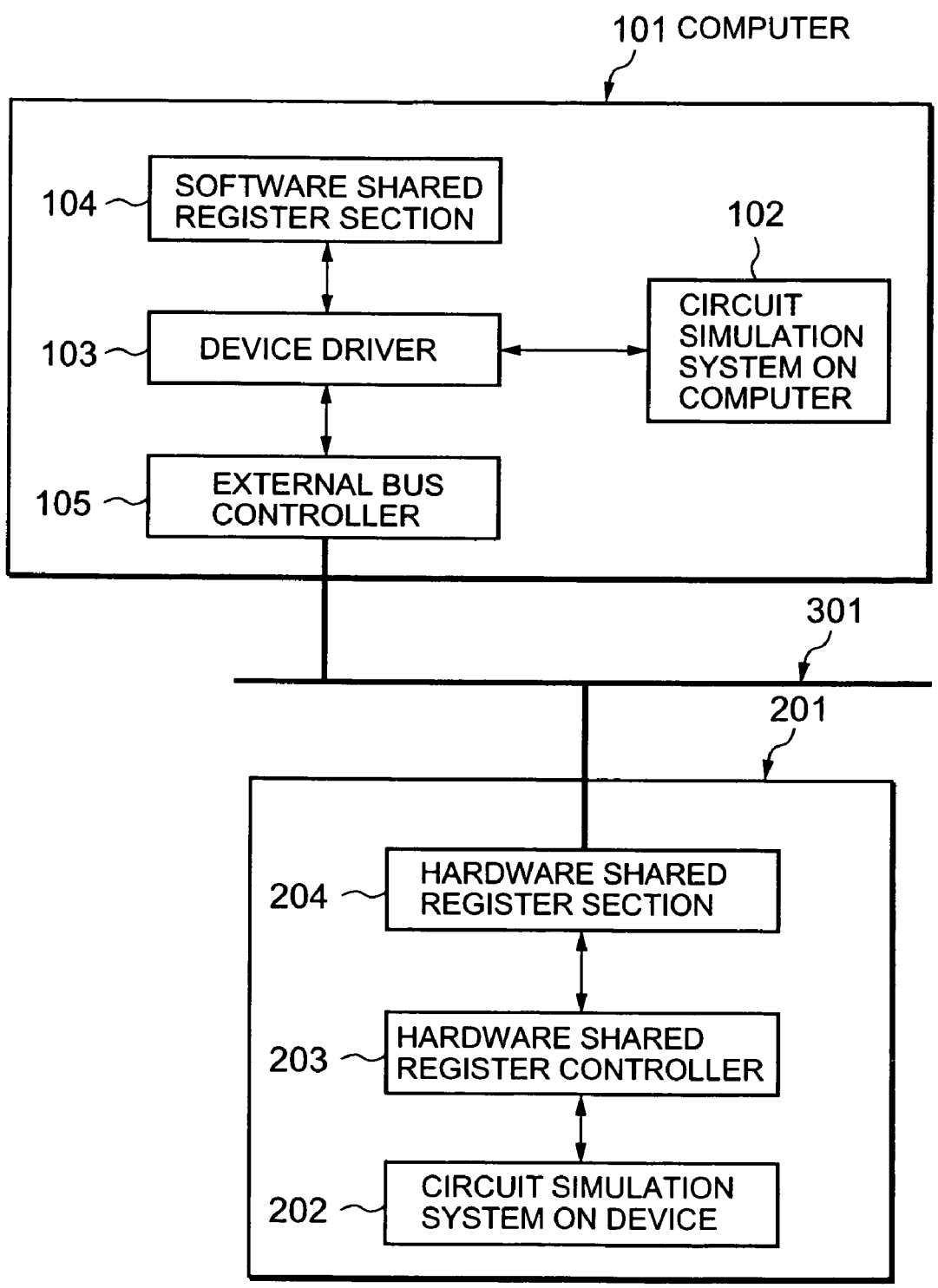
FIG. 4 is a block diagram showing the logic circuit verification system according to a first embodiment of the present invention.

Referring to FIG. 4, a logic circuit verification system according to a first embodiment of the present invention is composed of a computer 101 and a device simulator 201, which are connected by an external bus 301. The computer 101 is provided with a software shared register section 104, and the device simulator 201 is provided with a hardware shared register section 204. In the first embodiment, the shared register section 3 is composed of the software shared register section 104 and the hardware shared register section 204, and the data stored in these register sections 104 and 204 are controlled so as to always be the same.

The computer 101 has a program-controlled processor that generates a circuit simulation system 102 on the computer by executing the computer verification program as described above. In addition to the circuit simulation system 102 and the software shared register section 104, the computer 101 is provided with a device driver 103 and an external bus controller 105. The device driver 103 is a program component for enabling reading and writing from and to the hardware shared register section 204 and the software shared register section 104. The software shared register section 104 can be implemented by a software array that is a virtually generated register row in the memory space of the computer 101.

The device simulator 201 has a device-based circuit simulation system 202 implemented by a reconfigurable device; a hardware shared register controller 203; and the hardware shared register section 204 composed of a register row that is implemented as hardware.

As described above, when information is written in either the software shared register section 104 of the computer 101 or the hardware shared register section 204 of the device simulator 201, the same content is reflected in the other register through the device driver 103, the external bus controller 105, and the external bus 301. A specific example will be described with reference to FIG. 5.

Figure 5:
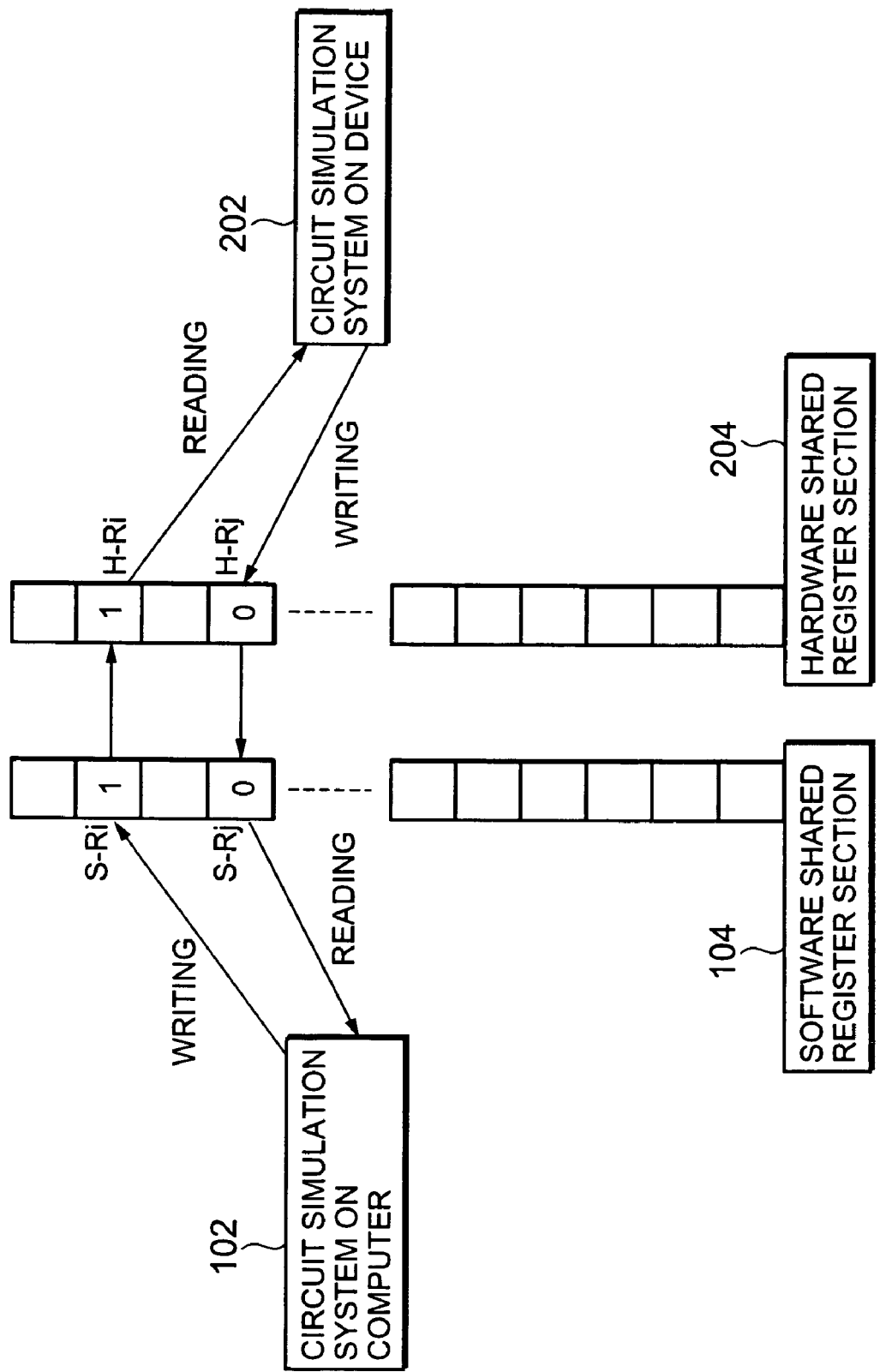
FIG. 5 is a schematic diagram illustrating the read/write operation of the software shared register section 104 and hardware shared register section 204 in the first embodiment of the present invention.

As shown in FIG. 5, when the circuit simulation system 102 on the computer writes a value of 1 in the shared register S-Ri of a certain register number in the software shared register section 104, a 1 is written in the shared register H-Ri of the corresponding register number in the hardware shared register section 204, and this is read by the circuit simulation system 202 on the device. Specifically, the signal values each corresponding to the shared registers S-Ri and H-Ri are transmitted from the circuit simulation system 102 on the computer to the circuit simulation system 202 on the device.

Conversely, when the circuit simulation system 202 on the computer writes a value of 0 in the shared register H-Rj of a certain register number in the hardware shared register section 204, a 0 is simultaneously written in the shared register S-Rj of the same register number in the software shared register section 104, and the circuit simulation system 102 on the computer reads the "0" from the register. Specifically, the signal values each corresponding to the shared registers S-Rj and H-Rj are transmitted from the circuit simulation system 202 on the device to circuit simulation system 102 on the computer, The shared register section 3, which is a communication means between the circuit simulation system 102 on the computer and the circuit simulation system 202 on the device, is thus composed of the software shared register section 104 and the hardware shared register section 204. Such a structure allows the logic circuit verification by making the contents of both register sections equal to each other.

Second Embodiment

Figure 6:
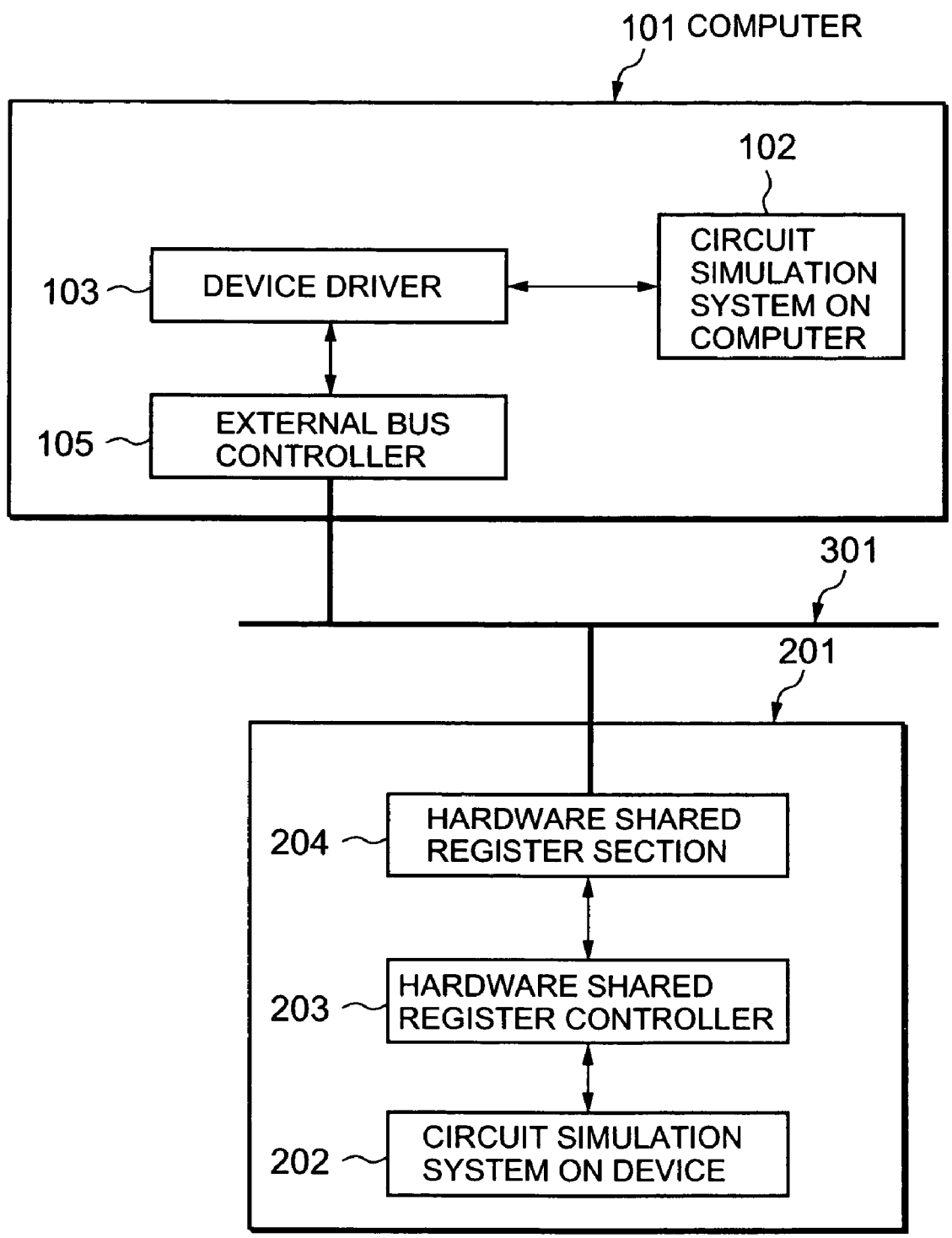
FIG. 6 is a block diagram showing the logic circuit verification system according to a second embodiment of the present invention.

As shown in FIG. 6, a second embodiment according to the present invention is the same as the first embodiment of FIG. 4, except that the software shared register section 104 is not provided to the computer 101. Specifically, the shared register section 3 is composed of the hardware shared register section 204 in the second embodiment. Accordingly, the device driver 103 of the computer 101 may include a program for enabling communication with the hardware shared register section 204. The shared register section 3 is composed solely of the hardware shared register section 204, so the circuit simulation system 102 on the computer and the circuit simulation system 202 on the device may reference the hardware shared register section 204 and transmit signals as described above. Accordingly, the control load on the computer 101 can be reduced, and the processing speed of the circuit simulation system 102 can be enhanced.

Third Embodiment

Figure 7:
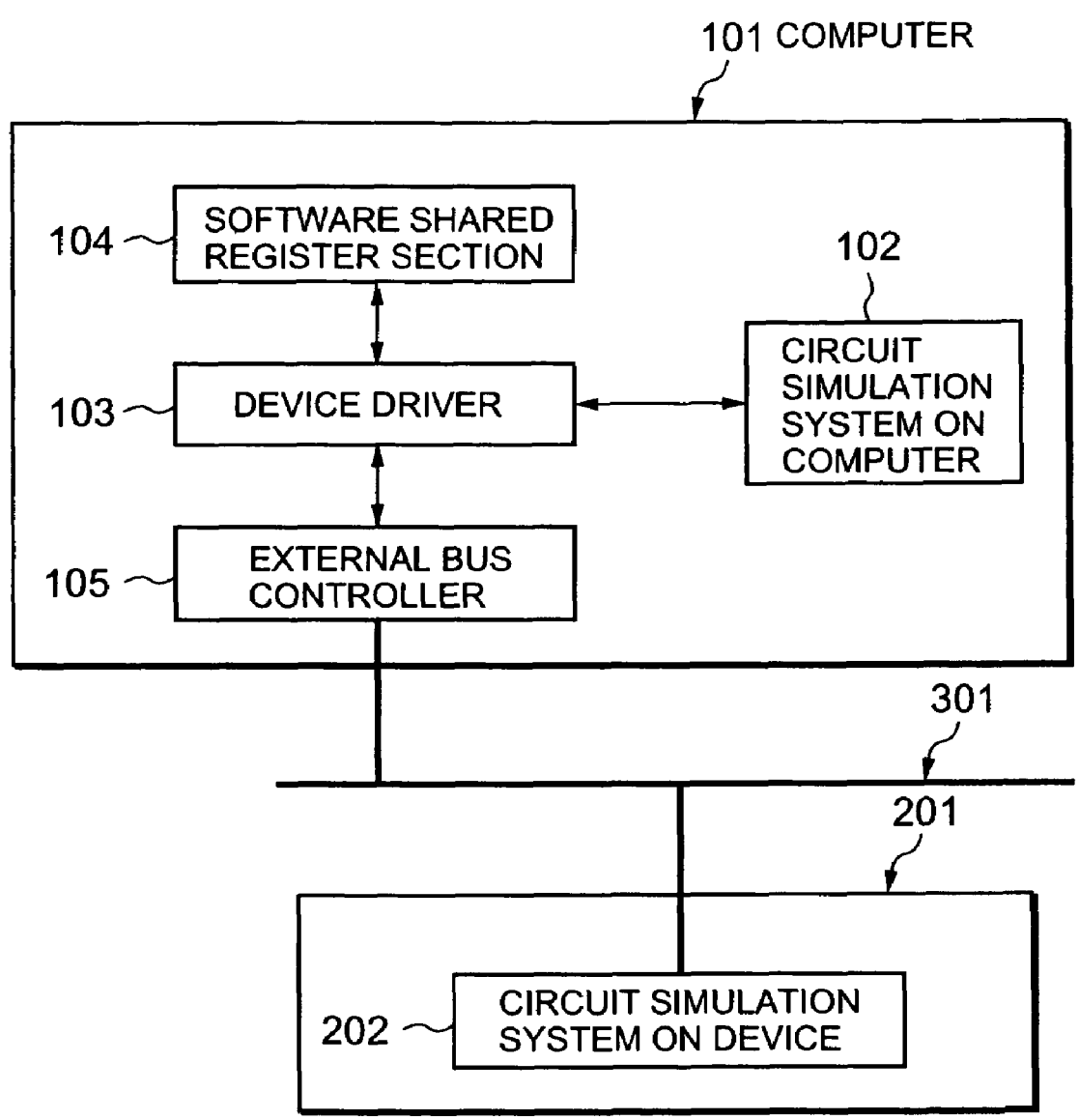
FIG. 7 is a block diagram showing the logic circuit verification system according to a third embodiment of the present invention.

As shown in FIG. 7, a third embodiment according to the present invention is the same as the first embodiment of FIG. 4, except that the hardware shared register controller 203 and hardware shared register section 204 are not provided to the device simulator 201. Specifically, the shared register section 3 is composed of the software shared register section 104 in the third embodiment. Accordingly, the device driver 103 of the computer 101 may include a program for enabling communication with the software shared register section 104. The shared register section 3 is composed solely of the software shared register section 104, so the shared register row can be generated by the computer 101 with the aid of software, and there is no need to install the hardware shared register section 204 as a piece of hardware in the device simulator 201. The shared register 3 therefore becomes easy to generate, and the hardware configuration is simplified.

Fourth Embodiment

Figure 8:
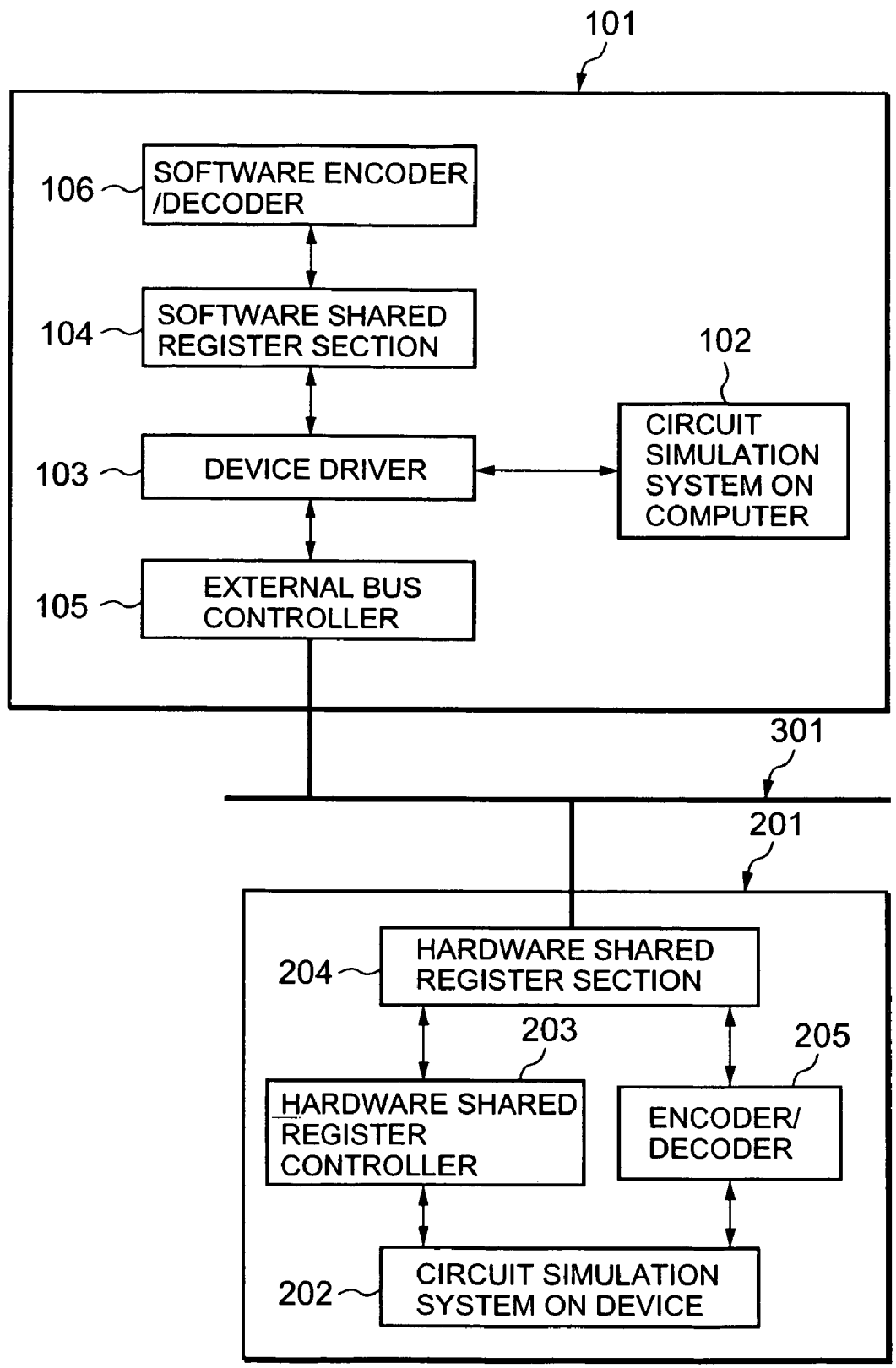
FIG. 8 is a block diagram showing the logic circuit verification system according to a fourth embodiment of the present invention.

As shown in FIG. 8, a fourth embodiment of the present invention is basically the same as that of the first embodiment of FIG. 4, except that a software encoder/decoder 106 is provided to the computer 101, and an encoder/decoder 205 is provided to the device simulator 201.

In the fourth embodiment, a register space equal to $2^N$ registers can be obtained by utilizing as an address N shared registers of the shared register section 3 composed of the software shared register section 104 and the hardware shared register section 204. For example, in the case where there are two shared registers in the shared register section 3, it looks as if there are four registers with the numbers 00, 01, 10, and 11. In general, a register space equal to $2^N$ registers can be mutually shared between the circuit simulation system 102 on the computer and the circuit simulation system 202 on the device.

What is claimed is:

1. A system for verifying a logic circuit by simulating an operation of the logic circuit, comprising:
    a program-based simulator for simulating a portion of the operation of the logic circuit using a program;
    a device-based simulator for simulating another portion of the operation of the logic circuit using a device; and
    a shared register section having a plurality of registers each corresponding to signals transmitted between the program-based simulator and the device-based simulator, wherein a register corresponding to a signal is accessed from the program-based simulator and the device-based simulator to allow transfer of the signal between the program-based simulator and the device-based simulator.

2. The system according to claim 1, wherein the shared register section comprises a first register section provided to the program-based simulator and a second register section provided to the device-based simulator, wherein values stored in the first register section are always made equal to those stored in the second register section.

3. The system according to claim 1, wherein the shared register section comprises a software register section provided to the program-based simulator.

4. The system according to claim 1, wherein the shared register section comprises a hardware register section provided to the device-based simulator.

5. The system according to claim 1, further comprising an encoder/decoder section for encoding and decoding data stored in N registers of the shared register section to logically identify $2^N$ shared registers, where N is an integer equal to 2 or above.

6. The system according to claim 1, wherein the operation of the logic circuit is divided between the portion simulated by the program-based simulator and the other portion simulated by the device-based simulator.

7. The system according to claim 6, wherein the transfer of one of the signals between the program-based simulator and the device-based simulator initiates a simulation of the other portion of the operation of the logic circuit by the device-based simulator.

8. The system according to claim 6, wherein the transfer of one of the signals between the program-based simulator and the device-based simulator terminates a simulation of the portion of the operation of the logic circuit by the program-based simulator.

9. The system according to claim 6,
    wherein the transfer of a first one of the signals between the program-based simulator and the device-based simulator initiates a simulation of the other portion of the operation of the logic circuit by the device-based simulator, and
    wherein the transfer of a second one of the signals between the program-based simulator and the device-based simulator terminates a simulation of the portion of the operation of the logic circuit by the program-based simulator.

10. The system according to claim 1, wherein the portion of the operation of the logic circuit simulated by the program-based simulator comprises execution of one or more circuit operations.

11. The system according to claim 10, wherein the one or more circuit operations comprises at least one of multiplication or branching.

12. The system according to claim 1, wherein the device is a reconfigurable device.

13. The system according to claim 1, wherein the device is a field programmable logic array (FPGA).

14. A method for verifying a logic circuit using a program-based simulation system for simulating a portion of an operation of the logic circuit using a program and a device-based simulation system for simulating another portion of the operation of the logic circuit using a device, comprising:
    preparing a plurality of shared registers, each of which is allowed to be accessed from the program-based simulation system and the device-based simulation system;
    allocating a plurality of signals transferred between the program-based simulation system and the device-based simulation system to different ones of the plurality of shared registers;
    writing data of a signal in a corresponding shared register by one of the program-based simulation system and the device-based simulation system; and
    reading the data of the signal from the corresponding shared register by the other of the program-based simulation system and the device-based simulation system.

15. The method according to claim 14, wherein the plurality of shared registers comprises a software shared register row provided by software to the program-based simulation system, and a hardware shared register row provided by hardware to the device-based simulation system, wherein the software shared register row and the hardware shared register row are controlled so as to be made equal in stored data to each other.

16. The method according to claim 14, wherein transmitting of one of the signals from the program-based simulation system to the device-based simulation system initiates a simulation of the other portion of the operation of the logic circuit by the device-based simulation system.

17. The method according to claim 16, wherein transmitting of a second one of the signals from the device-based simulation system to the program-based simulation system terminates a simulation of the portion of the operation of the logic circuit by the program-based simulation system.

18. A two-way communication method between a program-based simulation system for simulating a portion of an operation of a logic circuit using a program and a device-based simulation system for simulating another portion of the operation of the logic circuit using a device, comprising:
    allocating signals transmitted between the program-based simulation system and the device-based simulation system to different ones of a plurality of shared registers;
    when transmitting a signal from one of the program-based simulation system and the device-based simulation system to the other, causing the one to write data of the signal in a corresponding shared register; and
    when receiving the signal, causing the other to read the data of the signal from the corresponding shared register.

19. A computer-readable storage medium storing a computer-readable program for causing a computer to execute a process of verifying a logic circuit, the process comprising:

generating a program-based simulation system for simulating a portion of the operation of the logic circuit using the program;

generating a device-based simulation system for simulating another portion of the operation of the logic circuit using a device;

allocating signals transferred between the program-based simulation system and the device-based simulation system to different ones of a plurality of shared registers;

instructing one of the program-based simulation system and the device-based simulation system to write data of a signal to a corresponding shared register; and instructing the other of the program-based simulation system and the device-based simulation system to read the data of the signal from the corresponding shared register.

20. The storage medium according to claim 19, wherein the plurality of shared registers comprises a software shared register row provided by software to the program-based simulation system and a hardware shared register row provided by hardware to the device-based simulation system, wherein the software shared register row and the hardware shared register row are controlled so as to be made equal in stored data to each other.

* * * * *